United States Patent
Park et al.

(10) Patent No.: US 12,258,286 B2
(45) Date of Patent: Mar. 25, 2025

(54) METHOD OF CONCENTRATING HIGH-SALINITY RAW WATER

(71) Applicant: LG CHEM, LTD., Seoul (KR)

(72) Inventors: Jongbum Park, Daejeon (KR); Phill Lee, Daejeon (KR); Younghoon Ko, Daejeon (KR); Young Jun Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 579 days.

(21) Appl. No.: 17/617,387

(22) PCT Filed: Sep. 24, 2020

(86) PCT No.: PCT/KR2020/012956
§ 371 (c)(1),
(2) Date: Dec. 8, 2021

(87) PCT Pub. No.: WO2021/060872
PCT Pub. Date: Apr. 1, 2021

(65) Prior Publication Data
US 2022/0250949 A1 Aug. 11, 2022

(30) Foreign Application Priority Data
Sep. 27, 2019 (KR) .................. 10-2019-0119618

(51) Int. Cl.
*C02F 1/44* (2023.01)
*B01D 61/02* (2006.01)

(52) U.S. Cl.
CPC ............ *C02F 1/441* (2013.01); *B01D 61/025* (2013.01)

(58) Field of Classification Search
CPC .............................. C02F 1/441; B01D 61/025
See application file for complete search history.

(56) References Cited

U.S. PATENT DOCUMENTS

| | | |
|---|---|---|
| 2017/0056840 A1 | 3/2017 | Koehler et al. |
| 2017/0080389 A1* | 3/2017 | Kelada .................. F03G 7/005 |
| 2017/0349465 A1 | 12/2017 | Blohm et al. |
| 2018/0036682 A1 | 2/2018 | Nicoll et al. |

FOREIGN PATENT DOCUMENTS

| | | |
|---|---|---|
| CN | 103193294 | 7/2013 |
| CN | 109475818 | 3/2019 |
| CN | 110002544 | 7/2019 |
| CN | 110038435 | 7/2019 |
| JP | 2002-113465 | 4/2002 |
| JP | 2018-507105 | 3/2018 |
| KR | 10-0987294 | 10/2010 |
| KR | 10-2017-0097967 | 8/2017 |
| KR | 10-1822188 | 3/2018 |
| KR | 10-1929815 | 12/2018 |

OTHER PUBLICATIONS

Chen et al. (Unlocking High-Salinity Desalination with Cascading Osmotically Mediated Reverse Osmosis: Energy and Operating Pressure Analysis, Environ. Sci. Technol. 2018, 52, 2242-2250) (Year: 2018).*
Wu et al. (Pervaporative desalination of high-salinity water, Chemical Engineering Research and Design 136 (2018) 154-164) (Year : 2018).*
Ahunbay (Achieving high water recovery at low pressure in reverse osmosis processes for seawater desalination, Desalination 465 (2019) 58-68) (Year: 2019).*
International Search Report and the Written Opinion of PCT/KR2020/012956, mailed Jan. 8, 2021.

* cited by examiner

*Primary Examiner* — Youngsul Jeong
(74) *Attorney, Agent, or Firm* — Bryan Cave Leighton Paisner LLP

(57) ABSTRACT

Provided is a method for concentrating high-salinity raw water to obtain produced water satisfying Equation 1:

$$N_s = B^*(C_m - C_p) \qquad \text{<Equation 1>}$$

wherein:
B is a salt permeability constant (B-value), and is 3 GFD≤B≤150 GFD,
$N_s$ is an amount of salt permeating the separation membrane (GFD*ppm), and has a value of $F_p {}^* C_p$,
$C_m$ is a raw water-side separation membrane surface concentration (membrane concentration) (ppm),
$C_p$ is a produced water salt concentration (permeate concentration) (ppm), and
$F_p$ is produced water flux (permeate flux), and is 5 GFD≤$F_p$≤100 GFD,
by the method comprising passing raw water having a salt concentration of 70,000 ppm or greater through a separation membrane at a temperature of 40° C. or less and a pressure of 1,200 psi or less.

4 Claims, No Drawings

METHOD OF CONCENTRATING HIGH-SALINITY RAW WATER

CROSS-REFERENCE TO RELATED APPLICATIONS

This application is a National Stage Application of International Application No. PCT/KR2020/012956 filed on Sep. 27, 2020, which claims priority to and the benefits of Korean Patent Application No. 10-2019-0119618, filed with the Korean Intellectual Property Office on Sep. 27, 2019, the entire contents of which are incorporated herein by reference.

TECHNICAL FIELD

The present specification relates to a method for concentrating high-salinity raw water.

BACKGROUND

High salt concentration wastewater discharged from oilfields includes a higher concentration of salt compared to general sea water. Conventionally, high salt concentration wastewater has been buried or recycled, however, due to environmental reasons and limitations in recycling sites, a method of discharging high salt concentration wastewater after purification has been devised. A distillation method has been generally used to purify this high salt concentration wastewater, however, such a heat treatment method consumes much energy and thereby has low economic efficiency. In view of the above, technologies such as reverse osmosis, forward osmosis and membrane distillation have been developed for treating high salt concentration wastewater as above.

A phenomenon that a solvent moves from, between two solutions separated by a semi-permeable membrane, a solution with a low solute concentration to a solution with a high solute concentration through the separation membrane is referred to as an osmosis phenomenon, and herein, a pressure working on the side of the solution with a high solute concentration due to the solvent migration is referred to as an osmotic pressure. However, when applying an external pressure higher than an osmotic pressure to the high concentration side, the solvent moves from the solution side with a high solute concentration to the solution side with a low solute concentration, and this phenomenon is referred to as reverse osmosis. Using a reverse osmosis principle, various salts or organic substances can be separated through a semi-permeable membrane with a pressure gradient as a driving force. A reverse osmosis membrane using such a reverse osmosis phenomenon has been used to supply water for household, construction and industry after separating substances at a molecular level and removing salts from salt water or sea water.

BRIEF DESCRIPTION

Technical Problem

The present specification relates to a method for concentrating high-salinity raw water.

Technical Solution

One embodiment of the present specification provides a method for concentrating high-salinity raw water to obtain produced water satisfying the following Equation 1 by passing raw water having a salt concentration of 70,000 ppm or greater through a separation membrane at a temperature of 40° C. or less and a pressure of 1,200 psi or less:

$$N_s = B^*(C_m - C_p), \qquad \text{<Equation 1>}$$

wherein in Equation 1, B is a salt permeability constant (B-value), and is 3 GFD≤B≤150 GFD, $N_s$ is an amount of salt permeating the separation membrane (GFD*ppm), and has a value of $F_p^* C_p$, $C_m$ is a raw water-side separation membrane surface concentration (membrane concentration) (ppm), and $C_p$ is a produced water concentration (permeate concentration) (ppm); and $F_p$ is produced water flux (permeate flux), and is 5 GFD≤$F_p$≤100 GFD.

Advantageous Effects

Using a method for concentrating high-salinity raw water according to one embodiment of the present specification to concentrating high-salinity raw water is economically advantageous since a higher level of concentrating effect is obtained when applying a low raw water pressure.

DETAILED DESCRIPTION

In the present specification, a description of one member being placed "on" another member includes not only a case of the one member being in contact with the another member but a case of still another member being present between the two members.

In the present specification, a description of a certain part "including" certain constituents means capable of further including other constituents, and does not exclude other constituents unless particularly stated on the contrary.

One embodiment of the present specification provides a method for concentrating high-salinity raw water to obtain produced water satisfying the following Equation 1 by passing raw water having a salt concentration of 70,000 ppm or greater through a separation membrane at a temperature of 40° C. or less and a pressure of 1,200 psi or less:

$$N_s = B^*(C_m - C_p), \qquad \text{<Equation 1>}$$

wherein in Equation 1, B is a salt permeability constant (B-value), and is 3 GFD≤B≤150 GFD, $N_s$ is an amount of salt permeating the separation membrane (GFD*ppm), and has a value of $F_p^* C_p$, $C_m$ is a raw water-side separation membrane surface concentration (membrane concentration) (ppm), $C_p$ is a produced water salt concentration (permeate concentration) (ppm); and $F_p$ is produced water flux (permeate flux), and is 5 GFD≤$F_p$≤100 GFD.

Among methods for purifying high-salinity raw water discharged from oilfields, a method of using a reverse osmosis pressure is highly economic compared to other methods such as forward osmosis and membrane distillation and has an advantage of using existing reverse osmosis (RO) facilities, but has a disadvantage in that a high pressure of raw water osmotic pressure or higher needs to be applied to the raw water side. An osmotic pressure is proportional to a concentration, and therefore, a high raw water pressure is required when processing high salt concentration raw water in order to overcome the high raw water osmotic pressure. When using such a high raw water pressure, an increase in the operating costs occurs due to additional energy consumption. In addition, since existing reverse osmosis (RO) modules have not been manufactured to withstand such harsh operating conditions, a separate expensive and special reverse osmosis (RO) module facility is required for operation under such harsh conditions, and additional equipment costs are required accordingly.

In osmotically assisted reverse osmosis (OARO) that has been recently developed to overcome such a problem, high concentration of high-salinity water (draw solution) needs to be continuously introduced to a produced water side, and a concentration polarization phenomenon occurs at a membrane surface where the high-salinity water (draw solution) and the reverse osmosis produced water are mixed resulting in a disadvantage of lowering separation membrane efficiency.

On the other hand, the method for concentrating high-salinity raw water according to the present specification uses a separation membrane with higher salt permeability compared to existing technologies reducing an osmotic pressure difference between both sides of the separation membrane, and as a result, raw water can be concentrated even at a low operating pressure, and high produced water flux can be obtained. In other words, the method for concentrating high-salinity raw water according to the present specification has advantages of reducing the amount of energy consumption compared to existing methods for concentrating high-salinity raw water through a reverse osmosis process, and not requiring additional facility costs since high-salinity raw water can be concentrated using general reverse osmosis facilities.

$F_p$ (produced water flux) can be measured by collecting produced water passing through the separation membrane for a certain period of time and measuring the volume, $C_p$ (produced water concentration) can be measured using a method of measuring conductivity, and $C_m$ (raw water-side separation membrane surface concentration) can be measured using a method of measuring raw water conductivity and measuring a recovery rate. Specifically, raw water conductivity and produced water conductivity can be converted to a salt concentration using calibration data between the conductivity and the salt concentration. In addition, the separation membrane surface concentration can be calculated through a raw water concentration and a recovery rate in Equation 3 as follows.

$$C_m = k*C_f*Rec \qquad \text{<Equation 3>}$$

In Equation 3,
$C_m$ is a raw water-side separation membrane surface concentration (ppm),
$C_f$ is a raw water concentration (ppm),
k is an experimental constant, and
Rec is a recovery rate (%).

The recovery rate is a rate of raw water flux and produced water flux, and can be obtained by produced water flux ($F_p$)/raw water flux ($F_f$). The recovery rate can be from 1% to 80%, preferably from 5% to 60%, and more preferably from 10% to 40%.

B (salt permeability constant (B-value)) can be preferably 3 GFD≤B≤150 GFD, and more preferably 19 GFD≤B≤43 GFD.

B (salt permeability constant (B-value)) satisfying the above-described range is effective in enabling low pressure concentration due to a decrease in the osmotic pressure difference. Specifically, when the B value becomes lower than 3 GFD (80% rejection, 6,000 GPD flux) under a high salt condition, the produced water concentration becomes too low, and the effect of reducing the osmotic pressure difference is difficult to expect. When the B value is higher than 150 GFD (20% rejection, 20,000 GPD flux), the difference between the produced water concentration and the raw water concentration becomes small, and the concentrating effect targeted in the present specification hardly occurs. More specifically, when the B value is from 19 GFD (50% rejection, 9,000 GPD flux) to 43 GFD (50% rejection, 20,000 GPD flux), the effect of efficiently decreasing the osmotic pressure difference and the effect of concentrating more preferably occur.

Specifically, the flux of produced water passing through the separation membrane such as a reverse osmosis membrane can be calculated through the following Equations 4-1 to 4-3.

$$F_p = A*NDP \qquad \text{<Equation 4-1>}$$

$$NDP = P_f - \Delta\pi \qquad \text{<Equation 4-2>}$$

$$\Delta\pi = \pi_f - \pi_p \qquad \text{<Equation 4-3>}$$

In Equations 4-1 to 4-3,
$F_p$ is produced water flux (GFD),
A is a water permeability constant (A-value, and is 0.035 GFD/psi≤A≤0.10 GFD/psi,
NDP is a net driving pressure (psi),
$P_f$ is a raw water pressure (feed pressure) (psi),
π is an osmotic pressure (psi),
$\pi_f$ is a raw water osmotic pressure (feed osmotic pressure) (psi),
$\pi_p$ is a produced water osmotic pressure (permeate osmotic pressure) (psi), and
Δπ is a difference between the produced water osmotic pressure and the raw water osmotic pressure (psi).

In other words, in order to obtain produced water, a raw water pressure exceeding the osmotic pressure difference between the raw water and the produced water needs to be applied to the raw water side, and the produced water flux is proportional to an NDP (net driving pressure), a difference between the raw water pressure and the osmotic pressure difference.

By using a filter having salt permeability higher than existing technologies, the present specification increases the produced water concentration, which reduces the osmotic pressure difference, and as a result, a high NDP (net driving pressure) and resultant high produced water flux can be obtained even at a raw water pressure lower than existing technologies.

When referring to the following Equation 5, concentrated water flux decreases as produced water flux increases, which leads to an advantage of reducing the flux of concentrated water to discard even at a low raw water pressure.

$$F_f = F_p + F_c \qquad \text{<Equation 5>}$$

In Equation 5,
$F_f$ is raw water flux (GFD),
$F_p$ is produced water flux (GFD), and
$F_c$ is concentrated water flux (GFD).

In order to increase the produced water flux and decrease the concentrated water flux according to Equation 5 described above, an NDP (net driving pressure) needs to be increased. A method of increasing the NDP (net driving pressure) includes two methods of increasing a raw water pressure and decreasing an osmotic pressure.

In a water treatment method using an existing reverse osmosis, a separation membrane having high salt rejection of 99% or greater is used to obtain produced water with a low concentration, and, in order to overcome an osmotic pressure, a raw water pressure higher than a raw water osmotic pressure is applied to the separation membrane to increase produced water flux.

The method for concentrating high-salinity raw water according to the present specification is different from an existing reverse osmosis method in that a high NDP (net driving pressure) is obtained by reducing an osmotic pressure difference instead of applying a high raw water pressure.

Specifically, in the present disclosure, a separation membrane having high salt permeability is used to increase a produced water concentration, which increases a produced water osmotic pressure and thereby reduces an osmotic pressure difference between the separation membrane, and as a result, a high NDP (net driving pressure) can be obtained even at a low operating pressure, and high produced water flux and low concentrated water flux can be ultimately obtained.

As ways to overcome the needs for a high raw water pressure, techniques such as osmotically-assisted RO (OARO) or osmotically-enhanced RO (OERO) based on forward osmosis (FO) are currently being studied. These introduce, in addition to a reverse osmosis system, high-salinity water (draw solution) to a produced water side to increase a produced water concentration and thereby increase a produced water osmotic pressure, and, by reducing an osmotic pressure difference between both sides of the separation membrane, allow to obtain a high NDP (net driving pressure) even at a low raw water pressure.

However, these require continuous introduction of high-salinity water (draw solution) to the produced water side during operation. In addition, since an existing reverse osmosis membrane having low salt permeability is used, a disadvantage of a forward osmosis still remains, which is reducing reverse osmosis pressure efficiency due to a concentration polarization effect occurring on the produced water side by the concentration of the high-salinity water (draw solution) decreasing on the produced water-side separation membrane surface as the produced water having a low concentration passing through the separation membrane is mixed with the high-salinity water (draw solution) on the produced water side.

On the other hand, the present disclosure has an advantage of OARO (osmotically-assisted reverse osmosis), which allows concentration of high-salinity raw water even at a low pressure due to a high produced water osmotic pressure, and at the same time, is free from disadvantages of the OARO (osmotically-assisted reverse osmosis).

In the method for concentrating high-salinity raw water according to the present specification, separate high-salinity water (draw solution) is not required since a salt having a high concentration is directly introduced from the raw water side to the produced water side, and a complex facility of OARO to introduce the high-salinity water (draw solution) is not required as well. In other words, the present disclosure is clearly distinguished from existing prior documents in that a separate facility for introducing high-salinity water to produced water is not required.

In addition, a separation membrane with high salt permeability is used in the method for concentrating high-salinity raw water according to the present specification, and therefore, a concentration polarization effect on the raw water side is low compared to an existing reverse osmosis membrane, and since a solution flowing on the produced water side is only a solution passing through the separation membrane, a dilution effect does not occur on the produced water side, and as a result, a low concentration polarization effect occurs on the produced water side compared to forward osmosis (FO) or OARO (osmotically assisted reverse osmosis).

Accordingly, in the present disclosure, the same level of recovery rate and the effect of excellent high-salinity raw water concentration are obtained even when operating at a lower raw water pressure compared to existing technologies.

In the present specification, as the raw water, an aqueous solution including common salt (NaCl) used in an osmosis process such as shale gas produced water, sea water (SW), brackish water and industrial water can be used, and preferably, the raw water can be shale gas produced water.

One embodiment of the present specification provides a method for concentrating high-salinity raw water, wherein an osmotic pressure of the produced water is from 15% to 90% of an osmotic pressure of the raw water.

When the produced water osmotic pressure satisfies the above-described range, a difference between the produced water osmotic pressure and the raw water osmotic pressure is reduced, which is effective in concentrating high-salinity raw water at a low pressure.

The osmotic pressure difference between the raw water and the produced water can be measured using a method of measuring conductivity when chemical components of the raw water and the produced water are known.

In one embodiment of the present specification, the raw water has a concentration of greater than or equal to 70,000 ppm and less than or equal to 200,000 ppm.

When the raw water concentration satisfies the above-mentioned range, concentrating raw water concentration using a general reverse osmosis pressure separation membrane is impossible under a general reverse osmosis pressure product operating condition (800 psi, 25° C.), whereas using the method for concentrating high-salinity raw water is effective in accomplishing raw water concentrating even under a general reverse osmosis pressure operating condition.

The raw water concentration can be measured using a method of measuring conductivity when chemical components of the raw water are known.

In one embodiment of the present specification, the pressure is greater than or equal to 400 psi and less than or equal to 1,200 psi. This means that, in the "raw water having a concentration of 70,000 ppm or greater at a temperature of 40° C. or less and a pressure of 1,200 psi or less" described above, the pressure is "greater than or equal to 400 psi and less than or equal to 1,200 psi".

The pressure satisfying the above-mentioned range has an advantage of being economical since a high pressure that needs to be applied in a common osmosis process is not necessarily applied, and therefore, energy required for the osmosis process is significantly reduced.

In one embodiment of the present specification, salt rejection of the produced water satisfies the following Equation 2, and is from 10% to 85%.

$$\text{Salt rejection} = (1 - C_p/C_f) * 100 \qquad \text{<Equation 2>}$$

$C_p$ is a produced water concentration (permeate concentration) (ppm), and $C_f$ is a raw water concentration (feed concentration) (ppm).

Salt rejection of the produced water can be preferably from 40% to 80%, and more preferably from 45% to 60%.

By the salt rejection of the produced water satisfying the above-mentioned range, a difference in the osmotic pressure decreases by increasing the produced water osmotic pressure, and an effect of concentrating high-salinity raw water under a general reverse osmosis pressure operating condition is obtained.

In order to measure the salt rejection of the produced water, a water treatment module formed including a flat-plate permeation cell, a high-pressure pump, a storage tank and a cooling device can be used. After installing the separation membrane on the permeation cell, a sufficient preliminary operation is performed for approximately 1 hour using tertiary distilled water for evaluation device stabilization. After that, device stabilization is confirmed by operating the device for approximately 1 hour using the raw water at 400 psi to 1,200 psi and flux of 4 L/min, and salt concentrations before and after the permeation can be measured using a conductivity meter to calculate the salt rejection (%).

In the present specification, "salt" of the salt rejection can be typically sodium chloride (NaCl) or magnesium sulfate (MgSO$_4$), and other salts can be included as well. For example, when concentrating NaCl raw water having a salt concentration of 70,000 ppm, the salt rejection in the present specification means NaCl rejection, and when concentrating MgSO$_4$ raw water having a salt concentration of 70,000 ppm, the salt rejection in the present specification means MgSO$_4$ rejection.

In one embodiment of the present specification, flux ($F_p$) per area of the produced water is greater than or equal to 5 GFD and less than or equal to 100 GFD.

The "area" in the flux per area can mean 400 ft$^2$ or 440 ft$^2$.

In the present specification, GFD is a flux unit, and means gallon/ft$^2$/day (gallon per square foot per day).

In the present specification, GPD is a flux unit, and means gallon/day (gallon per day).

In a separation membrane, flux is generally inversely proportional to salt rejection. Accordingly, the flux of the produced water can increase as the salt rejection of the produced water decreases.

In order to measure the flux of the produced water, a water treatment module formed including a flat-plate permeation cell, a high-pressure pump, a storage tank and a cooling device can be used. After installing the separation membrane on the permeation cell, a sufficient preliminary operation is performed for approximately 1 hour using tertiary distilled water for evaluation device stabilization. After that, device stabilization is confirmed by operating the device for approximately 1 hour using an aqueous sodium chloride solution having a salt concentration of 70,000 ppm or greater at 400 psi to 1,200 psi and flux of 4 L/min, and the flux can be calculated by measuring the amount of water permeated for 10 minutes at 25° C. Specifically, the salt rejection (%) and the flux can be measured under a condition of pH 7 to pH 8.

In one embodiment of the present specification, the separation membrane is a reverse osmosis membrane.

The separation membrane can be a microfiltration membrane, an ultrafiltration membrane, a nanofiltration membrane, a reverse osmosis membrane or the like, and can be preferably a nanofiltration membrane or a reverse osmosis membrane.

Other constitutions, manufacturing methods and the like of the separation membrane are not particularly limited, and general means known in the art can be employed without limit.

Produced water obtained using the method for concentrating high-salinity raw water according to the present specification can be purified to final produced water of drinking water quality after going through an additional separation process as necessary. The additional separation process is not particularly limited, and processes in the art can be properly employed.

EXAMPLES

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

Example and Comparative Example

Raw water (aqueous sodium chloride solution) having a salt concentration of 70,000 ppm was passed through a separation membrane under a condition of 25° C. and 800 psi, and results on salt permeability constant (B-value), salt rejection and flux were obtained as described in the following Table 1.

In order to measure the salt rejection and the flux, a water-treatment module formed including a flat-plate permeation cell, a high-pressure pump, a storage tank and a cooling device was used. After installing the separation membrane on the permeation cell, a sufficient preliminary operation was performed for approximately 1 hour using tertiary distilled water for evaluation device stabilization. After that, device stabilization was confirmed by operating the device for approximately 1 hour using the aqueous sodium chloride solution having a salt concentration of 70,000 ppm at 800 psi and flux of 4 L/min, and the flux was calculated by measuring the amount of water permeated for 10 minutes at 25° C., and salt concentrations before and after the permeation were measured using a conductivity meter to calculate the salt rejection (%). The results are shown in the following Table 1.

The salt permeability constant (B-value) and the salt rejection were calculated using the following <Equation 1> and <Equation 2>.

$$N_s = B^*(C_m - C_p),  \qquad \text{<Equation 1>}$$

In Equation 1, B is a salt permeability constant (B-value), and is 3 GFD≤B≤150 GFD, $N_s$ is an amount of salt permeating the separation membrane (GFD*ppm), and has a value of $F_p^*C_p$, $C_m$ is a raw water-side separation membrane surface concentration (membrane concentration) (ppm), $C_p$ is a produced water concentration (permeate concentration) (ppm), and $F_p$ is produced water flux (permeate flux), and is 5 GFD≤$F_p$≤100 GFD.

$$\text{Salt rejection} = 1 - C_p/C_f  \qquad \text{<Equation 2>}$$

In Equation 2, $C_p$ is a produced water concentration (permeate concentration) (ppm), and $C_f$ is a raw water concentration (feed concentration) (ppm).

$F_p$ (produced water flux) was measured by collecting produced water passing through the separation membrane for 10 minutes and measuring the volume, $C_p$ (produced water concentration) was measured through measuring conductivity of the produced water, and $C_m$ (raw water-side separation membrane surface concentration) was measured through concentration and recovery rate of the raw water of the following Equation 3.

$$C_m = k * C_f * \text{Rec} \qquad \text{<Equation 3>}$$

In Equation 3, $C_m$ is a raw water-side separation membrane surface concentration (ppm), $C_f$ is a raw water concentration (ppm), k is an experimental constant, and Rec is a recovery rate (%).

The recovery rate is a rate of raw water flux and produced water flux, and was obtained by produced water flux ($F_p$)/raw water flux ($F_f$).

$C_f$ (raw water concentration) was measured through measuring conductivity of the raw water.

The conductivity was measured using a conductivity meter.

TABLE 1

| | Salt Rejection (%) | Flux (GPD) | Salt Permeability Constant (B-value) (GFD) | Produced Water Flux (GFD) | Produced Water Salt Concentration (ppm) |
|---|---|---|---|---|---|
| Example 1 | 20 | 10,000 | 75 | 20 | 57,000 |
| Example 2 | 20 | 20,000 | 150 | 40 | 60,000 |
| Example 3 | 50 | 10,000 | 22 | 17 | 41,000 |
| Example 4 | 50 | 20,000 | 43 | 33 | 43,000 |
| Example 5 | 80 | 10,000 | 5.6 | 11 | 24,000 |
| Example 6 | 80 | 20,000 | 11 | 22 | 25,000 |
| Comparative Example | 99.85 | 9,000 | 0.031 | 0.68 | 3,000 |

Salt rejection and flux of Table 1 mean performance under a standard condition of the reverse osmosis pressure module having a membrane area of 400 ft² (800 psi, 25° C., 32,000 ppm NaCl, 15% recovery rate, pH 7 to 8).

Produced water flux and produced water concentration of Table 1 mean measurement values of produced water passing through each of the reverse osmosis pressure separation membranes under the evaluation condition (NaCl 70,000 ppm, 800 psi, 25° C.).

In Table 1, the examples are cases of purifying high-salinity raw water using a semi-permeable membrane having high salt permeability, and the comparative example is a case of purifying high-salinity raw water using a semi-permeable membrane having general low salt permeability.

As identified in Table 1, high produced water flux was obtained when purifying the high-salinity raw water under a general reverse osmosis pressure operating condition in the evaluation results corresponding to the examples, and the produced water collected herein can be purified to final produced water of drinking water quality through an additional reverse osmosis pressure process.

On the other hand, it was identified that, in the comparative example, produced water with very low flux was obtained when purifying the high-salinity raw water under a general reverse osmosis pressure operating condition.

Hereinbefore, preferred embodiments of the present disclosure have been described, however, the present disclosure is not limited thereto, and various modifications can be implemented in the scope of the claims and the scope of the detailed descriptions of the disclosure, and these also fall within the category of the present disclosure.

The invention claimed is:

1. A method for concentrating high-salinity raw water to obtain produced water satisfying the following <Equation 1>, the method comprising passing the high-salinity raw water having a salt concentration of 70,000 ppm or greater through a separation membrane at a temperature of 40° C. or less and a pressure of greater than or equal to 400 psi and less than or equal to 900 psi:

$$N_s = B * (C_m - C_p), \qquad \text{<Equation 1>}$$

wherein in the <Equation 1>:

B is a salt permeability constant (B-value) of the separation membrane, and is 3 gallons per square foot per day (GFD) (gal/ft²/day) ≤ B ≤ 150 gallons per square foot per day (GFD) (gal/ft²/day);

$N_s$ is an amount of salt permeating the separation membrane (GFD*ppm), and has a value of $F_p * C_p$;

$C_m$ is a raw water-side separation membrane surface concentration (membrane concentration) (ppm); and $C_p$ is a produced water salt concentration (permeate concentration) (ppm), wherein $F_p$ is produced water flux (permeate flux), and is 5 GFD ≤ $F_p$ ≤ 100 GFD, wherein an osmotic pressure of the produced water is from 15% to 90% of an osmotic pressure of the high-salinity raw water, and wherein the separation membrane is a reverse osmosis membrane.

2. The method for concentrating high-salinity raw water of claim 1, wherein the high-salinity raw water has a salt concentration of greater than or equal to 70,000 ppm and less than or equal to 200,000 ppm.

3. The method for concentrating high-salinity raw water of claim 1, wherein the pressure is greater than or equal to 400 psi and less than or equal to 800 psi.

4. The method for concentrating high-salinity raw water of claim 1, wherein salt rejection of the produced water satisfies the following <Equation 2>, and is greater than or equal to 10% and less than or equal to 85%:

$$\text{salt rejection} = (1 - C_p/C_f) * 100 (\%) \qquad \text{<Equation 2>}$$

in the <Equation 2>:

$C_p$ is a produced water salt concentration (permeate concentration) (ppm); and $C_f$ is a raw water salt concentration (feed concentration) (ppm).

* * * * *